Oct. 2, 1945.  G. E. EHRLING  2,386,096
SUPERCHARGER
Filed Sept. 24, 1941   2 Sheets-Sheet 1
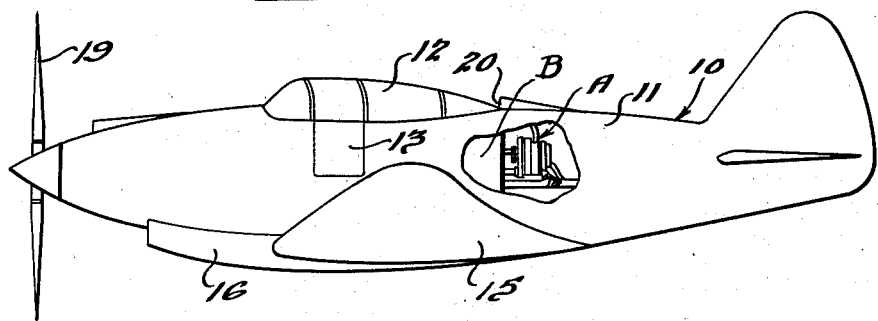
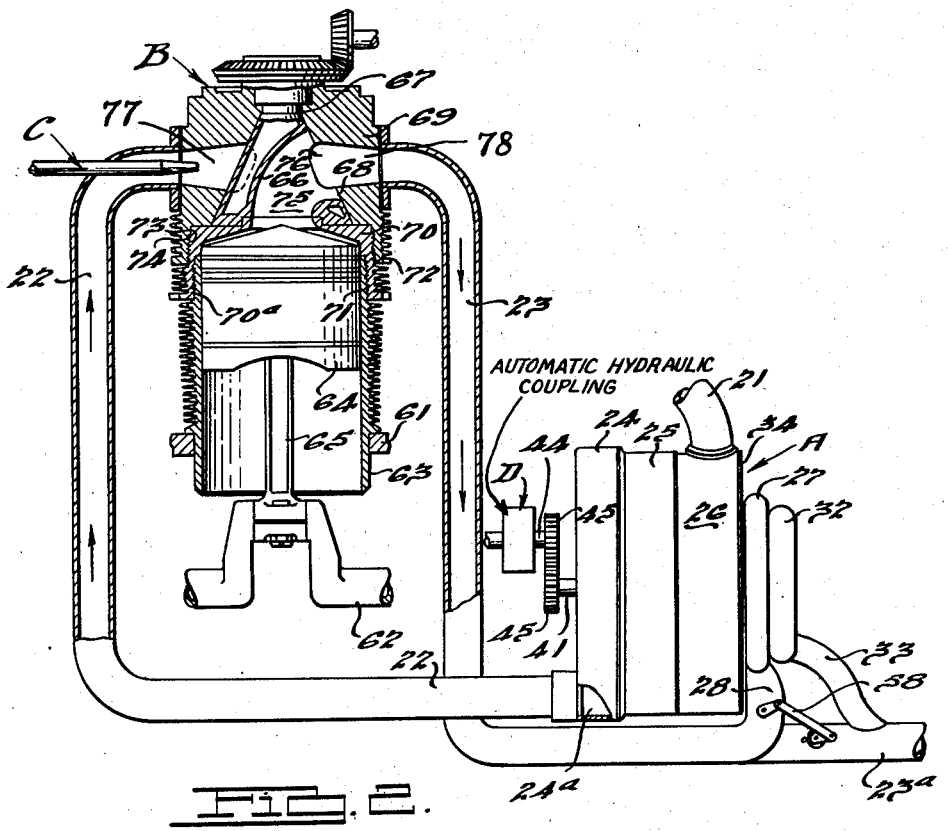
INVENTOR
Gunnar E. Ehrling.
BY
Gray and Smith
ATTORNEYS.

Oct. 2, 1945.        G. E. EHRLING        2,386,096
SUPERCHARGER
Filed Sept. 24, 1941        2 Sheets-Sheet 2

INVENTOR
*Gunnar E. Ehrling.*
BY
*Gray and Smith*
ATTORNEYS.

Patented Oct. 2, 1945

2,386,096

UNITED STATES PATENT OFFICE 2,386,096

SUPERCHARGER

Gunnar E. Ehrling, Detroit, Mich., assignor to Briggs Manufacturing Company, Detroit, Mich., a corporation of Michigan Application September 24, 1941, Serial No. 412,085

8 Claims. (Cl. 230—130)

This invention relates to the induction system of internal combustion engines and more particularly to a supercharging device for an aircraft engine.

Many modern aircraft engines of over 400 H. P. are equipped with the "internal" or gear driven type of supercharger which comprises a centrifugal compressor which functions to more thoroughly vaporize the fuel charge, to assure equal distribution to the cylinders, and to deliver the charge to the cylinders under a positive pressure whereby engine power is maintainable at altitudes up to 20,000 feet. By the use of such a supercharger the air may be delivered to the engine at approximately ground level atmospheric pressure. Above 20,000 feet, however, when the "internal" type supercharger has reached its critical altitude, an "external" or turbo type of supercharger has been used successfully as a second stage supercharger and which functions to maintain a carburetor air intake pressure equivalent to the maximum pressure required by the internal supercharger. By the use of the turbo type as a second stage supercharger, the engine is permitted to develop its normal rated horsepower up to altitudes as high as 30,000 to 35,000 feet.

While the turbo type of supercharger has been used with some success as a second stage supercharger, its inherent advantages have heretofore been limited by the necessity of a cumbersome installation and numerous mechanical difficulties incident thereto.

The need for higher altitude operation of the modern aircraft engine such for example as altitudes of 30,000 to 40,000 feet presents a new problem in effecting a relatively compact and efficiently operated supercharger capable of maintaining a carburetor air intake pressure of approximately 14.7 pounds per square inch at such altitudes to develop the full rated horse-power of the engine based upon sea level operation.

It is an object of this invention to provide an improved supercharger of the two-stage type which will maintain carburetor air intake pressure at altitudes above the effective range of the conventional supercharger.

It is another object of the invention to provide an improved supercharger of the foregoing type embodying a gear driven impeller or blower connected in series or tandem with a turbine driven impeller or blower.

A further object of the invention is to provide a supercharging device for an aircraft engine comprising a gear driven impeller and a turbo driven impeller, connected in series or tandem and each utilizing a common air intake.

Another object of the invention is to provide a supercharging device for an aircraft engine comprising a gear driven impeller and a turbo driven impeller, connected in series and each utilizing a common air intake, said turbo driven impeller adapted to function when said gear driven impeller can no longer maintain a sufficient pressure in the intake manifold.

A further object of the invention is to provide a supercharging device for an aircraft engine comprising a gear driven impeller and a turbo driven impeller, connected in series and each utilizing a common air intake, said turbo driven impeller having a flexible speed control adapted to control the impeller speed to insure uniform performance of the engine when the critical altitude of the gear driven impeller has been reached.

Another object of the invention is to provide a supercharging device for an aircraft engine comprising a gear driven impeller and a turbo driven impeller, connected in series and each utilizing a common air intake, said turbo driven impeller having a flexible speed control comprising a manifold pressure operated device which is adapted to control the impeller speed to insure uniform performance of the engine when the critical altitude of the gear driven impeller has been reached.

A further object of the invention is to provide an improved supercharger of the foregoing type having a manual or automatically controlled hydraulic coupling between the power plant and the compressors to prevent excessive boost at sea level operation.

A further object of the invention is to provide a supercharger which will not only be highly efficient in operation under varying conditions but will also be compact, relatively simple in construction, lighter in weight, and which will occupy a minimum of space thus providing a structure having important advantages, in connection with aircraft required to travel at high altitudes, by achieving desirable savings in weight and space occupied.

Other objects of this invention will appear in the following description and appended claims, reference being had to the accompanying drawings forming a part of this specification wherein like reference characters designate corresponding parts in the several views.

Fig. 1 is a side view of an aircraft embodying the present invention, part of the wall being broken away to show the arrangement of the operative part of the supercharger device.

Fig. 2 is a diagrammatic view illustrating a two-stage supercharger embodying the present invention and the induction system combined therewith.

Figure 3:
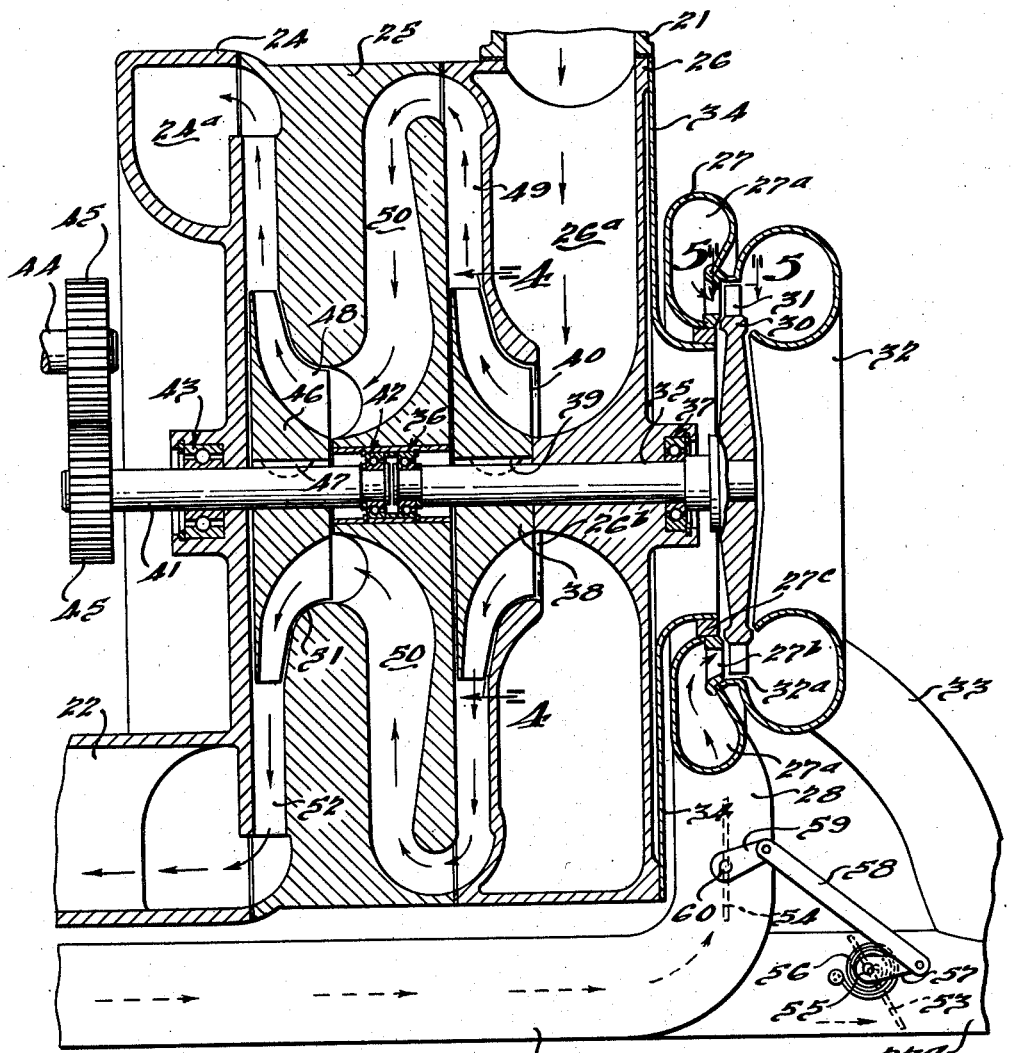
Fig. 3 is an enlarged sectional view of the supercharger designated as A in Fig. 1.
Figure 4:
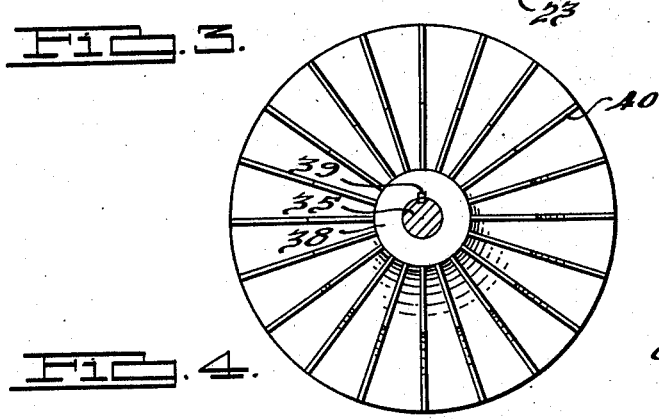
Fig. 4 is a plan view of one of the impellers or blowers taken through lines 4—4 of Fig. 3 looking in the direction of the arrows.
Figure 5:
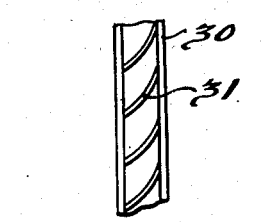
Fig. 5 is a plan view of the vanes or buckets of the turbine rotor taken through line 5—5 of Fig. 3 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is shown by way of example an airplane equipped with a power plant including a supercharger embodying the present invention. Although the present invention is illustrated and described in connection with a conventional engine of the cylinders in line type housed within the fuselage of the airplane, it will be understood that it may be applied to engines of various types, such as for example, the radial type of engine which may extend partially or wholly outside of any portion of the airplane fuselage or wings.

Referring to the drawings, there is shown in Fig. 1 an airplane generally indicated by the numeral 10 and comprising a main body portion or fuselage 11 having a passenger compartment 12 formed therein, into which access may be had through a door 13. The wings 15 and retractable landing gear 16 are secured to the fuselage 11 in a manner well known in the art. Within the fuselage 11, susbtantially in the mid-portion thereof, there is formed a power plant compartment in which there is operatively arranged an internal combustion engine 18 adapted to drive a screw propeller 19. A supercharger device designated by the letter A and embodying the present invention driven by the engine 18 is operatively arranged within the power plant compartment and suitably connected to an air intake port 20.

In the present instance the supercharger comprises a compact unitary housing which may, as illustrated in Fig. 3, be formed in sections bolted together. By way of example, the illustrated housing comprises three sections or blocks 24, 25 and 26, suitably cast and machined so as to fit together to form the unitary housing.

The end section 24 provides for a blower outlet ring or header and the opposite end section 26 forms the intake ring or header of the supercharger. Within section 26 is an annular passage 26a which communicates with an air intake conduit or nozzle 21 communicating with port 20. Within the section 24 is an annular passage 24a which communicates with an air outlet conduit 22.

Leading from engine B is a conventional exhaust conduit 23 which normally extends at 23a to the atmosphere in accordance with conventional practice. The exhaust gases flowing from the engine cylinder through conduit 23 may be by-passed to the supercharger by means of a by-pass conduit 28 which communicates with a ring 27 having an annular passage 27a communicating through annularly arranged slots 27b with a collector ring 32 having an annular throat opening 32a arranged opposite the slots 27b so as to communicate therewith. A turbine wheel or rotor 30 is arranged axially with respect to the collector ring 32 and has vanes or buckets 31 projecting into the throat opening 32a.

It will be seen that the exhaust gases may be by-passed through conduit 28 and slots or openings 27b into the annular passage formed by collector ring 32 and thence returned to the exhaust conduit 23a through the return pipe or conduit 33 leading from the collector ring 32. The slots 27b may be formed in a separate ring 27c which together with ring 27 is supported from the section 26 by a supporting plate or member 34. The collector ring 32 may be attached to the ring 27 in any suitable manner.

The turbine rotor 30 is suitably attached to the end of a shaft 35 extending through the housing member 26, the inner end of the shaft being journalled or supported in bearings 36 within the intermediate housing member 25 and the outer end journalled or supported in suitable bearings 37 carried by the end housing member 26.

Keyed at 39 to shaft 35 is a turbine driven impeller 38 which rests within a recess centrally of the housing member 26. This impeller is provided with suitable blades 40 arranged opposite an annular outer opening 26b leading from the passage 26a.

Arranged in line with the shaft 35 is an engine or gear driven impeller shaft 41 extending through the end housing section 24 into the intermediate housing section 25. The inner end of the shaft 41 is journalled in bearings 42 located adjacent the bearings 36 for the inner end of shaft 35. The opposite or outer end of the shaft 41 is journalled in suitable bearings 43 carried by end section 24. The outer end of the shaft 41 extends beyond the housing member 24 and may be driven from a shaft 44 through reduction gearing 45. The shaft 44 is operated in suitably timed relation from the crankshaft.

Keyed at 47 to the shaft 41 is an impeller body 46 having suitably formed impeller blades 48, the impeller being arranged within a recess formed centrally of the housing member 25.

In the present instance the drive from the engine crankshaft through shaft 44 to shaft 41 is preferably a variable speed drive which may be accomplished by the use of an automatic hydraulic coupling D of any conventional kind which may be actuated by atmospheric pressure or any other suitable means for varying the speed of impeller 46 depending upon the altitude of the airplane.

The impeller blades 40 draw air through passage 26b and force the air through an annular passage or conduits 49 in the housing member 26 into conduits 50 formed in the intermediate housing 25. These conduits communicate with the space or chamber 51 within which the impeller blade 48 rotates. The chamber 51 communicates through an annular chamber or conduit 52 with the annular passage 24a in the end section 24 of the housing.

The flow of the exhaust gases either directly from conduit 23 through its extension 23a to atmosphere or through the by-pass conduit 28, or both, is preferably automatically controlled such as by means of interconnected butterfly valves. As illustrated in Fig. 3, butterfly valve 53 is arranged in the exhaust conduit extension 23a and a butterfly valve 54 is arranged in a by-pass conduit 28. Any suitable means may be provided for automatically controlling these valves determined by the speed of rotation of the impeller 46 and consequently the speed of operation of the engine crankshaft. For example, the butterfly valve 53 may be mounted eccentrically upon a shaft 55 so as to be unbalanced and biased in one direction and hence to be normally rotated or turned toward open position by the flow of the exhaust gases through the conduit portions 23 and 23a. Opening movement of the valve 53 due to the impact flow of the exhaust gases may be resisted by means of a spring 56 so tensioned or loaded and of such strength as to move the valve into closed position when the pressure of the exhaust gases upon the valve falls below a predetermined magnitude. With this arrangement it will be seen that valve 53 at certain times under maximum pressure of the exhaust gases will be wide open and as the pressure reduces gradually in magnitude the valve 53 will be moved proportionately toward closed position cutting off progressively the effective opening in the conduit 23a past the valve. Secured to the shaft 55 is a crank arm 57 to the end of which is pivoted a link 58, this link in turn being pivoted to the end of a crank arm 59 attached to a shaft 60 upon which is mounted the butterfly valve 54. The butterfly valve 54 is preferably of the balanced type so as to provide substantially equal areas at opposite sides of the shaft axis 60. From this construction it will be seen that as the offset butterfly valve 53 is swung toward open position, the valve 54 will be correspondingly swung towards closed position. Thus when valve 53 is wide open, which will occur when the power output is at its maximum such as at low altitudes, the valve 54 will be substantially closed, cutting off the by-pass conduit 28.

The turbine rotor 30 is a variable speed rotor, which speed is dependent upon the flow of the exhaust gases through conduit 28 which in turn is governed by the effective opening past the butterfly valve 54. Therefore, as the airplane gains altitude, the speed of the impeller 38 will increase gradually thereby increasing the flow of turbine inducted air through the common intake nozzle 21. Accordingly at the critical altitude the butterfly valve 53 will be completely closed and the flow of the exhaust gases will be directed entirely past the open butterfly valve 54 and through bypass conduit 28 to the turbine rotor 30. Conversely when the airplane loses altitude the speed of the impeller 38 will gradually lessen as the manifold pressure increases and the gear driven impeller 46 becomes effective, which pressure gradually opens the butterfly valve 53 which in turn closes the butterfly valve 54 thus directing the flow of the exhaust gases through conduit 23a to the atmosphere. Thus it can be seen that the flow of air through the turbine driven impeller increases and decreases gradually in accordance with the varying conditions and is thereby effective in producing a very uniform performance of the engine.

By way of example there is illustrated in Fig. 2 one manner in which the gear and turbine driven impellers arranged in tandem may be located within the supercharger housing. It is understood, however, that they may be arranged in tandem in any suitably designed housing to provide the requisite compactness and efficiency desirable for maximum performance.

There is also illustrated diagrammatically in Fig. 2 the manner in which the exhaust gases flow from the engine B through the manifold 23 to the turbine driven impeller. The common intake conduit 21 is shown which may be of any desired shape and length and may be attached in any suitable manner to an air intake port 20 located upon the fuselage of the airplane at some suitable point such as illustrated in Fig. 1. The compressed air flows through the annular passage 24a of the section 24 directly into conduit 22 which leads to the usual intake manifold of the internal combustion engine B which may be of any suitable construction. The fuel mixture or charge may be provided either through the use of a carburetor interposed in the conduit 22 or, as herein indicated, through suitable fuel injectors C.

The engine B illustrated in Fig. 2 comprises generally a suitable crankcase 61 within which is mounted a crankshaft 62 supported in bearings according to conventional practice. A cylinder 63 is secured rigidly to the crankcase and has its lower or inner end projecting thereinto. Mounted to reciprocate within the cylinder is a piston 64 adapted to be connected in the usual manner by a connecting rod 65 to the crankshaft 62. The engine is of the multi-cylinder type, one cylinder being illustrated by way of example.

The combustion chamber of the cylinder is formed principally within a rotor or a rotary member 66, this member comprising a frustoconical body arranged immediately above the piston when at the top of its stroke and also having a cylindrical stem 67 projecting from the outer end of the rotor body. The rotor 66 fits within a correspondingly shaped substantially frusto-conical cavity 68 in an upper cylinder head member 69. The cylinder head of the engine may be said to comprise two portions or members secured together and to the upper end of the cylinder 63. In addition to the outer member 69 the cylinder comprises an intermediate member 70 which may be termed the rotor mask or shield and forming the throat opening from the cylinder into the combustion chamber. The upper and outer end of the cylinder is formed with external threads 71 which are engaged by internal threads 72 on the cylinder skirt portion 70a of the member 70. This latter member in turn is provided with external threads 73 which are engaged by internal threads 74 on the cylindrical skirt portion 70 of the outer cylinder head member 69.

The combustion chamber 75 within the rotor 66 has a port 76 which, during rotation of the rotor, successively registers with inlet passage 77 and outlet passage 78 in the cylinder head 69 which in turn register respectively with conduits 22 and 23.

I claim:
1. In a supercharger for an internal combustion engine having a drive shaft and an exhaust conduit, a housing support, an impeller carried by said support and drivingly connected to said drive shaft, a second impeller carried by said support, a turbine rotor drivingly connected to said second impeller, a by-pass exhaust conduit operably associated with said rotor, means for automatically varying the flow of exhaust gases through said by-pass conduit to said turbine rotor, said means comprising a valve in said by-pass conduit and a flow actuated valve in said exhaust conduit connected to said first named valve for operating the same, a common air intake for both of said impellers, and a common air outlet from said impellers to the engine, the connection between said valves being such that said first named valve closes as said second named valve opens and vice versa and the speed of said turbine rotor increases or decreases in proportion respectively to the opening or closing of said first named valve.

2. In a supercharger for an internal combustion engine having a drive shaft and an exhaust conduit, a housing support, an impeller carried by said support and drivingly connected to said drive shaft, a second impeller carried by said support, a turbine rotor drivingly connected to said second impeller, a by-pass exhaust conduit operably associated with said rotor, means for automatically varying the flow of exhaust gases through said by-pass conduit to said turbine rotor, said means comprising a valve in said by-pass conduit and an unbalanced butterfly valve in said exhaust conduit connected to said first named valve for operating the same, a common air intake for both of said impellers, and a common air outlet from said impellers to the engine, the connection between said valves being such that said first named valve closes as said second named valve opens and vice versa and the speed of said turbine rotor increases or decreases in proportion respectively to the opening or closing of said first named valve.

3. In a supercharger for an internal combustion engine having a drive shaft and an exhaust conduit, a support, an impeller carried by said support, a second impeller carried by said support, a turbine rotor drivingly connected to said second impeller, means including a flow responsive unbalanced butterfly valve in the exhaust conduit for by-passing exhaust gases from said exhaust conduit to said turbine rotor to drive the second impeller, a common air intake for both of said impellers separate from said exhaust conduit and by-pass means, and a common air outlet from said impellers to the engine, said valve opening or closing in response respectively to increased or decreased flow of exhaust gases through the exhaust conduit thereby respectively decreasing or increasing the flow to said rotor and proportionately varying the speed thereof.

4. In a supercharger for an internal combustion engine having a drive shaft and an exhaust conduit, a support, an impeller carried by said support and drivingly connected to said drive shaft, a second impeller carried by said support, a turbine rotor drivingly connected to said second impeller, a by-pass exhaust conduit operably associated with said rotor, means for automatically varying the flow of exhaust gases through said by-pass conduit to said turbine rotor, said means comprising a balanced butterfly valve in said by-pass conduit, and an unbalanced flow actuated butterfly valve in said exhaust conduit connected to said first named valve for operating the same, the connection between said valves being such that said first named valve closes as said second named valve opens and vice versa and the speed of said turbine rotor increases or decreases in proportion respectively to the opening or closing of said first named valve.

5. In a supercharger for an internal combustion engine having a drive shaft and an exhaust conduit, a support, an impeller carried by said support and drivingly connected to said drive shaft, a second impeller carried by said support, a turbine rotor drivingly connected to said second impeller, a by-pass conduit for by-passing exhaust gases from said exhaust conduit to said turbine rotor and thence back to the exhaust conduit thereby to drive the second impeller, a common air intake passage in said support within which said impellers are located, said air intake passage being separate from said by-pass conduit, a common air outlet from said impellers to the engine, and means including a valve in said exhaust conduit adapted to automatically open or close in response respectively to increased or decreased flow through said exhaust conduit thereby respectively to decrease or increase the flow of gases through the by-pass conduit to the rotor and proportionately vary the speed thereof.

6. In a supercharger for an internal combustion engine having a drive shaft and an exhaust conduit, a housing support, an impeller carried by said support and drivingly connected to said drive shaft, a second impeller carried by said support, a turbine rotor drivingly connected to said second impeller, a by-pass exhaust conduit operably associated with said rotor, means including a valve adapted to open or close in response to increased or decreased flow of exhaust gases through said exhaust conduit for respectively decreasing or increasing the flow of said gases through the by-pass conduit thereby proportionately varying the speed of said turbine rotor, a common air intake for both of said impellers, and a common air outlet from said impellers to the engine.

7. In a supercharger for an internal combustion engine having a drive shaft and an exhaust conduit, a housing support, a gear driven impeller carried by said support, an exhaust driven impeller arranged in tandem with said gear driven impeller and carried by said support, a common air intake for both of said impellers, a common air outlet from said impellers to the engine, and an unbalanced valve responsive to the flow of gases in said exhaust conduit and adapted to open or close in response respectively to increased or decreased flow of said gases thereby respectively decreasing or increasing the flow of said gases effective to drive the exhaust driven impeller, the speed of said exhaust driven impeller varying in proportion to said last mentioned flow.

8. In a supercharger for an internal combustion engine having a drive shaft and an exhaust conduit, a housing support, an impeller carried by said support and drivingly connected to said drive shaft, a second impeller carried by said support and mounted to rotate about an axis coincident with the axis of rotation of said first named impeller an independently thereof, a turbine rotor drivingly connected to said second impeller, a by-pass exhaust conduit operably associated with said rotor, a common air intake for both of said impellers, a common air outlet from said impellers to the engine, and means including a valve in said exhaust conduit adapted to automatically open or close in response respectively to increased or decreased flow through said exhaust conduit thereby respectively to decrease or increase the flow of gases through the by-pass conduit to the rotor and proportionately vary the speed thereof.

GUNNAR E. EHRLING.